United States Patent
Ishigo et al.

(10) Patent No.: US 8,556,513 B2
(45) Date of Patent: Oct. 15, 2013

(54) CONNECTING ROD BEARING IN INTERNAL COMBUSTION ENGINE

(75) Inventors: Osamu Ishigo, Inuyama (JP); Atsushi Okado, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 566 days.

(21) Appl. No.: 12/714,945

(22) Filed: Mar. 1, 2010

(65) Prior Publication Data
US 2010/0220945 A1 Sep. 2, 2010

(30) Foreign Application Priority Data
Feb. 27, 2009 (JP) ................................ 2009-045311

(51) Int. Cl.
*F16C 33/10* (2006.01)
(52) U.S. Cl.
USPC ........................................ 384/288; 384/291
(58) Field of Classification Search
USPC ....... 384/288, 291, 294, 429, 430; 123/196 R
See application file for complete search history.

(56) References Cited

U.S. PATENT DOCUMENTS

| | | | | |
|---|---|---|---|---|
| 3,386,783 A | * | 6/1968 | Scheufler | 384/291 |
| RE39,613 E | * | 5/2007 | Niwa et al. | 384/294 |
| 7,234,870 B2 | * | 6/2007 | Kitahara et al. | 384/288 |
| 7,572,060 B2 | * | 8/2009 | Kuroda et al. | 384/276 |
| 8,147,144 B2 | * | 4/2012 | Ishigo et al. | 384/288 |
| 2010/0316313 A1 | * | 12/2010 | Ishigo et al. | 384/288 |
| 2011/0243486 A1 | * | 10/2011 | Ukai et al. | 384/288 |
| 2012/0008889 A1 | * | 1/2012 | Nakagawa et al. | 384/294 |

FOREIGN PATENT DOCUMENTS

| | | | |
|---|---|---|---|
| JP | 8277831 A | | 10/1996 |
| JP | 2005069283 A | | 3/2005 |
| JP | 2005069284 | * | 3/2005 |

OTHER PUBLICATIONS

Translation of JP 08-277831 obtained on May 7, 2012.*
Translation of JP 2005-069284 obtained on May 7, 2012.*

* cited by examiner

*Primary Examiner* — Thomas R Hannon
*Assistant Examiner* — Adam D Rogers
(74) *Attorney, Agent, or Firm* — Browdy and Neimark, PLLC (57) ABSTRACT

A connecting rod bearing in which a semi-cylindrical bearing has an inner circumferential groove that extends from an abutting end with respect to another semi-cylindrical bearing toward a circumferential center part of the semi-cylindrical bearing, and is in alignment with an outlet port of a lubricant oil passage, the abutting end being oriented toward the same direction as a direction of relative rotation of the crankpin with respect to the connecting rod bearing. The dimension are sized such that the connecting rod bearing is capable of preventing large size foreign substances from entering into the clearance defined along the inner surface of the connecting rod bearing even though foreign substances, accompanied in the lubricant oil which is fed to the connecting rod bearing from a cylinder block of an internal combustion engine through the journal portion of a crankshaft, is not caused to discharge from the connecting rod bearing.

7 Claims, 6 Drawing Sheets

DEPTH OF SCRATCH IN INNER SURFACE OF BEARING AFTER TEST

CONNECTING ROD BEARING IN INTERNAL COMBUSTION ENGINE

INCORPORATION BY REFERENCE

The present application claims priority from JP patent application Ser. No. 2009-045311 filed on Feb. 27, 2009, the content of which is hereby incorporated by reference into this application.

BACKGROUND OF THE INVENTION

The present invention relates to a connecting rod bearing, consisting of a pair of semi-cylindrical bearings, for an internal combustion engine, for rotatably supporting a crankpin which connects a connecting rod and a crankshaft to each other, wherein lubricant oil is supplied to an inner surface of the connecting rod bearing, the lubricant oil being supplied at first to an inner surface of a main bearing which supports a crankshaft, and caused to flow in an inner lubricant oil passage formed in the crankshaft toward the inner surface of the connecting rod bearing.

In the internal combustion engine, the crankshaft is supported, at its journal portion, in a lower section of an engine cylinder block through a main bearing consisting of a pair of semi-cylindrical bearings. With regard to the main bearing, the lubricant oil discharged from an oil pump is supplied into a lubricant oil groove, which is formed on the inner surface of the main bearing, from an oil gallery formed in the wall of the cylinder block through a through-hole formed in the wall of the main bearing. The journal portion is provided with a first lubricant oil passage formed through diametrically in the journal portion, which passage is in fluid communication with the lubricant oil groove via opposite end openings of the first lubricant oil passage. Further, a second lubricant oil passage is formed in the journal portion and a crank arm portion, branching from the first lubricant oil passage diametrically formed in the journal part. The second lubricant oil passage is in fluid communication with a third lubricant oil passage formed diametrically through a crankpin. Thus, the lubricant oil, which is supplied into the lubricant oil grooves formed on the inner surface of the main bearing from the oil gallery formed in the wall of the cylinder block through the through hole formed in the wall of the main bearing, is supplied into a clearance between sliding surfaces of the crankpin and the connecting rod bearing from an outlet port at an end part of the third lubricant oil passage through the first to third oil passages.

The lubricant oil, which is fed from the engine cylinder block into the connecting rod bearing through the journal portion, may be accompanied with foreign substances existing ab ovo in lubricant oil passages in the pertinent members. Should the foreign substances accompanied in the lubricant oil be fed into a clearance between sliding surfaces of the crankpin and the connecting rod bearing, there is a risk that the sliding surface of the connecting rod bearing may be damaged. It has been believed that the foreign substances having entered into the clearance between the sliding surfaces of the crankpin and the connecting rod bearing should be immediately discharged from the clearance.

As a countermeasure against the foreign substances accompanied in the lubricant oil, there has been proposed a way of discharging the foreign substances accompanied in the lubricant oil from the main bearing which supports the journal portion of the crank shaft and which consists of a pair of semi-cylindrical bearings, wherein one of the semi-cylindrical bearings is provided with an axial groove along its circumferential ends on the inner surface side of the semi-cylindrical bearing, and which has a through hole adapted to directly receive the lubricant oil supplied from an oil gallery formed in the cylinder block wall, so as to be in fluid communication with a circumferential lubricant oil groove formed on the inner surface throughout the circumferential length of the semi-cylindrical bearing and connected to the through hole (cf. JP-A-8-277831 and JP-A-2005-69283).

Consideration with the abovementioned proposal:

While the crank shaft is provided, as set forth above, with the second lubricant oil passage branched off from the first lubricant oil passage diametrically formed in the journal portion of the crank shaft, and passing through the crank arm portion, wherein the second lubricant oil passage is in fluid communication with the third lubricant oil passage which is formed diametrically in the crankpin, there may remain large burrs, each having an extended planar shape consisting of a metal of the crank shaft (usually steel), in a connecting part (i.e. a crossing part) between the first and second oil passages and in the connecting part (i.e. a crossing part) between the second lubricant oil passage and the third lubricant oil passage formed in the crankshaft, since the first, second and third lubricant oil passages are formed by drilling. Should the burrs be sheared by the lubricant oil stream during operation of an internal combustion engine, the burrs are accompanied in the oil stream and fed to an outlet port of the third lubricant oil passage which outlet port is located at the surface of the crankpin. If the size of the burrs is larger than that of the clearance between the inner surface of the connecting rod bearing and the crankpin, the burrs remain at the position of the outlet port of the third lubricant oil passage at the surface of the crankpin since they cannot enter into the bearing clearance, thereby damaging the inner surface of the connecting rod bearing while the burrs are dragged relative to the connecting rod bearing in the bearing clearance between the connecting rod bearing and the rotating crankpin. In this case, the dragging is continued until the burrs become smaller in size so as to be able to enter into the bearing clearance after the burrs have been sheared by a shear force acting thereon, thereby the inner surface of the connecting rod bearing is seriously damaged.

Thus, when intending to apply the idea of the above proposal into the connecting rod bearing, it will be needed to form the axial grooves having a very large sectional area along the circumferential ends on the inner surface side of the semi-cylindrical connecting rod bearing in order to cause the large size foreign substances accompanied in the lubricant oil to discharged from the inner surface of the bearing.

However, these years, in internal combustion engines, efforts have been made for the purpose of making oil pumps for the lubricant oil smaller in size in order to lower the fuel consumption, thereby the supply quantity of the lubricant oil onto the sliding surface of a bearing has been decreased as compared with old type internal combustion engines. Thus, should the axial groove be provided with a large sectional area in order to discharge the foreign substances, as in the above proposal, the leakage amount of the lubricant oil will increase resulting in an insufficient supply of the lubricant oil onto the sliding surface of the bearing.

SUMMARY OF THE INVENTION

The present invention was devised under the above technical background.

An object of the present invention is to provide a connecting rod bearing which is capable of preventing large size foreign substances from entering into the clearance defined along the inner surface of the connecting rod bearing even though the foreign substances, accompanied in the lubricant oil which is fed to the connecting rod bearing from a cylinder block of an internal combustion engine through the journal portion of a crankshaft, is not caused to discharge from the connecting rod bearing.

Thus, according to a first aspect of the present invention, there is provided:

a connecting rod bearing for an internal combustion engine being so constituted that lubricant oil, which has been supplied onto an inner surface of a main bearing for supporting a crank shaft, is supplied onto an inner surface of the connecting rod bearing, rotatably supporting a crankpin connecting a connecting rod to the crank shaft, from a lubricant oil outlet port at a surface of the crankpin through an oil passage in the crank shaft, the connecting rod bearing consisting of a pair of semi-cylindrical bearings one of which is an upper semi-cylindrical bearing which is disposed on a connecting rod side of a big end housing of the connecting rod, and the other one of which is a lower semi-cylindrical bearing which is disposed on a cap side of the big end housing of the connecting rod, and the upper semi-cylindrical bearing being assembled so that a circumferential center part thereof is in alignment with the axis of the connecting rod, wherein at least one of the semi-cylindrical bearings is provided with a circumferential groove on an inner surface of the one semi-cylindrical bearing, which circumferential groove extends from at least one of two abutting ends with respect to the other semi-cylindrical bearing toward a circumferential center part of the one semi-cylindrical bearing, and is in alignment with the lubricant oil outlet port, the at least one abutting end being oriented toward the same direction as a direction of relative rotation of the crankpin with respect to the connecting rod bearing, and wherein the circumferential groove has a depth of 0.1 to 0.8 mm; a circumferential length which is not less than a diameter of the lubricant oil outlet port, the diameter being measured in the circumferential direction of the semi-cylindrical bearing, which maximum limit length corresponds to a circumferential angle of 45 degree measured from the at least one abutting end as a start point, and which does not include a length of a groove region adjacent to a terminal end of the circumferential groove on a side of the circumferential center part of the one semi-cylindrical bearing; and a width of which is not less than one half of the diameter of the lubricant oil outlet port, the diameter being measured in the axial direction of the semi-cylindrical bearing, which maximum width is defined by widths of inner surface regions locating on both axial sides of the circumferential groove, each of the widths being 2 mm.

In a first embodiment of the connecting rod bearing, the maximum width of the circumferential groove is equal to the diameter of the lubricant oil outlet port as measured in the axial direction of the semi-cylindrical bearing.

In a second embodiment of the connecting rod bearing, the cross-sectional area of the circumferential groove becomes gradually larger from the circumferentially center part side of the inner surface of the semi-cylindrical bearing toward the abutting end thereof. According to such a configuration, the flow rate of the lubricant oil flowing in the circumferential groove becomes smaller from the circumferential center part side toward the abutting end of the semi-cylindrical bearing, thereby enabling the foreign substances, accompanied in the lubricant oil and having a larger size than a bearing clearance between the connecting rod and the semi-cylindrical bearing, to remain in the circumferential groove in a trapped state without escaping therefrom.

According to a third embodiment of the connecting rod bearing, in a state that the pair of semi-cylindrical bearings are assembled cylindrically by abutting the abutting ends with one another, there is formed an axial groove along an overall inner side corner edge of an abutting end of at least one of the semi-cylindrical bearings, on which abutting end side there is present the circumferential groove, the axial groove being connected to the circumferential groove in fluid communication with each other serving as a lubricant oil passage, wherein a cross-sectional area of the circumferential groove being greater than that of the axial groove at an connection part of the circumferential groove and the axial groove. With such a configuration, the flow rate of the lubricant oil flowing in the axial groove is higher than that in the circumferential groove, so that the foreign substances, accompanied in the lubricant oil having flown into the axial groove and having a comparatively small size so as to be able to enter into the bearing clearance, can be immediately discharged outside from the axial groove.

It is noted that the term "cross-sectional area of the axial groove" means a cross sectional area defined by inner walls of a groove which is formed by cutting overall inner side corner edges of abutting ends of the semi-cylindrical bearings, and phantom inner surfaces of the semi-cylindrical bearings in the case where the groove is not formed, which cross sectional area is parallel to a plane perpendicular to the bearing axis.

In a fourth embodiment of the connecting rod bearing, the axial groove includes a crush relief formed in the inner surface of the semi-cylindrical bearing, adjacent to the abutting end of the semi-cylindrical bearing. Even in conventional semi-cylindrical bearings, the lubricant oil and the foreign substances have been discharged outside through such crush reliefs in the axial direction. However, according to an experimental result, it was found that most of the foreign substances remain in the crush reliefs. In this embodiment, by providing the semi-cylindrical bearing with the axial groove including the crush relief, the foreign substances, which have been likely to remain in the crush reliefs, can be smoothly discharged outside from the bearing.

Here, it is noted that the words "the axial groove includes a crush relief" means that when the crush reliefs are formed by reducing a wall thickness of each of the opposite end parts of the semi-cylindrical bearing (with respect to the abutting end parts which are mated with the other one of the semi-cylindrical bearings) on an open side of the semi-cylindrical bearing so that the wall thickness is made smaller than that of the circumferential center part of the semi-cylindrical bearing, a depth of the axial groove exceeds a reduction thickness size of the wall thickness by forming the crush relief.

In a fifth embodiment of the connecting rod bearing, each of the pair of semi-cylindrical bearings is provided with the circumferential groove and the axial groove, and the grooves of the pair of semi-cylindrical bearings are arranged line-symmetrically with reference to the axis of the connecting rod bearing. According to such an arrangement, during the operation of an internal combustion engine, the frequency of the repetitive communication of the diametrical through hole of the crankpin with the circumferential grooves in the connecting rod bearing, when the crankpin rotates, becomes greater in comparison with the provision of a single circumferential groove, thereby the foreign substances accompanied in the lubricant oil, having a comparatively small size capable of entering into the bearing clearance, and flowing in the circumferential grooves and the axial grooves together with the lubricant oil can be efficiently discharged outside of the bearing. When the diametrical through hole in the crankpin is communicated with the circumferential groove of the connecting rod bearing, the foreign substances remained in the circumferential groove is smoothly fed toward the axial groove by the lubricant oil fed from the diametrical through hole.

In a sixth embodiment of the connecting rod bearing, one of the semi-cylindrical bearings has two circumferential grooves and two axial grooves, wherein each of the circumferential grooves is formed on the inner surface of the one semi-cylindrical bearing, the circumferential groove extending from one of the two abutting ends with respect to the other semi-cylindrical bearing toward a circumferential center part of the one semi-cylindrical bearing, being in alignment with the lubricant oil outlet port, and having a circumferential length which is not less than a diameter of the lubricant oil outlet port, the diameter being measured in the circumferential direction of the semi-cylindrical bearing, which maximum limit length corresponds to a circumferential angle of 45 degrees measured from the one abutting end as a start point, and wherein in a state that the pair of semi-cylindrical bearings are assembled cylindrically by abutting the abutting ends with one another, there is formed each of the two axial grooves along an overall inner side corner edge of at least one of the respective two abutting ends of the pair of semi-cylindrical bearings, on which one abutting end side there is present one of the circumferential grooves, each axial groove being connected to one of the circumferential grooves in fluid communication with each other serving as a lubricant oil passage.

In this case, since the foreign substances, which are accompanied in the lubricant oil flowing in the one circumferential groove disposed on a side of the abutting end oriented to the direction opposite to the rotational direction of the crankpin and which have a large size, are likely brought into a small depth region of the one circumferential groove, which depth region is present on a side of the circumferential center part, there is a possibly that the foreign substances contact with the lubricant oil outlet port of the crankpin. Thus, it is preferable to make a relationship between a depth of the circumferential groove at the abutting end and a length of the circumferential groove so as to satisfy the equation of (a depth of the circumferential groove at the abutting end)/(a length of the circumferential groove)>0.02. According to such a relationship, since the depth of the circumferential groove on the abutting end side is large, the surface of the crankpin and the bottom surface of the circumferential groove are well spaced from each other, a wedge effect can hardly occur with regard to the oil flow, a flow rate of the lubricant oil is low, and the pressure of the lubricant oil is low. On the other hand, in the other end region of the circumferential groove, since the surface of the crankpin and the bottom surface of the circumferential groove close to each other, the pressure of the lubricant oil becomes higher due to the wedge effect. If the difference in oil pressure between the both circumferential ends of the circumferential groove is large, the oil flow toward the direction opposite to the rotating direction of the crankpin occurs in the vicinity of the bottom surface of the circumferential groove on the side of the abutting end oriented to the direction opposite to the rotating direction of the crankpin, so that the foreign substances having a large size is restrained from moving toward the small depth region of the circumferential groove, thereby enabling the foreign substances having a large size to remain in the circumferential groove.

According to a seventh embodiment of the connecting rod bearing, each of the pair of semi-cylindrical bearings has two circumferential grooves and two axial grooves, wherein the circumferential grooves extend from the two abutting ends of each semi-cylindrical bearing, respectively, which abut on the corresponding abutting ends of the mating semi-cylindrical bearing, toward the circumferential center part of each semi-cylindrical bearing, and are in alignment with the lubricant oil outlet port, and have a circumferential length which is not less than ½ of a diameter of the lubricant oil outlet port, the diameter being measured in the circumferential direction of the semi-cylindrical bearing, which maximum limit length corresponds to a circumferential angle of 45 degree measured from the one abutting end as a start point, and wherein in a state that the pair of semi-cylindrical bearings are assembled cylindrically by abutting the abutting ends with one another, there is formed each of the two axial grooves along an overall inner side corner edge of at least one of the respective two abutting ends of the pair of semi-cylindrical bearings, each axial groove being connected to one of the circumferential grooves in fluid communication with each other serving as a lubricant oil passage. Also in this case, by the same reason as set forth in the sixth embodiment, it is preferable to make a relationship between a depth of the circumferential groove at the abutting end and a length of the circumferential groove so as to satisfy the equation of (a depth of the circumferential groove at the abutting end)/(a length of the circumferential groove)>0.02.

According to a second aspect of the present invention, there is provided a connecting rod bearing device in an internal combustion engine, comprising a connecting rod bearing for rotatably supporting a crankpin connecting a connecting rod to a crankshaft, and a big end housing of the connecting rod for accommodating and holding therein the connecting rod bearing, the connecting rod bearing device being so constituted that lubricant oil, which has been supplied onto an inner surface of a main bearing for supporting a crank shaft, is supplied onto an inner surface of the connecting rod bearing, rotatably supporting a crankpin connecting a connecting rod to the crank shaft, from a lubricant oil outlet port at a surface of the crankpin through an oil passage in the crank shaft, and the connecting rod bearing consisting of a pair of semi-cylindrical bearings one of which is an upper semi-cylindrical bearing which is disposed on a connecting rod side of a big end housing of the connecting rod, and the other one of which is a lower semi-cylindrical bearing which is disposed on a cap side of the big end housing of the connecting rod, and the upper semi-cylindrical bearing being assembled so that a circumferential center part thereof is in alignment with the axis of the connecting rod, wherein at least one of the semi-cylindrical bearings is provided with a circumferential groove on an inner surface of the one semi-cylindrical bearing, which circumferential groove extends from at least one of two abutting ends with respect to the other semi-cylindrical bearing toward a circumferential center part of the one semi-cylindrical bearing, and is in alignment with the lubricant oil outlet port, the at least one abutting end being oriented toward the same direction as a direction of relative rotation of the crankpin with respect to the connecting rod bearing, wherein the circumferential groove has a depth of 0.1 to 0.8 mm; a circumferential length which is not less than a diameter of the lubricant oil outlet port, the diameter being measured in the circumferential direction of the semi-cylindrical bearing, which maximum limit length corresponds to a circumferential angle of 45 degree measured from the at least one abutting end as a start point, and which does not include a length of a groove region adjacent to a terminal end of the circumferential groove on a side of the circumferential center part of the one semi-cylindrical bearing; and a width of which is not less than one half of the diameter of the lubricant oil outlet port, the diameter being measured in the axial direction of the semi-cylindrical bearing, which maximum width is defined by widths of inner surface regions locating on both axial sides of the circumferential groove, each of the widths being 2 mm, and wherein in a state that the pair of semi-cylindrical bearings are assembled cylindrically by abutting the abutting ends with one another, there is formed an axial groove along an overall inner side corner edge of an abutting end of at least one of the semi-cylindrical bearings, on which abutting end side there is present the circumferential groove, the axial groove being connected to the circumferential groove in fluid communication with each other serving as a lubricant oil passage, wherein a cross-sectional area of the circumferential groove being greater than that of the axial groove at an connection part of the circumferential groove and the axial groove.

According to the present invention, at least one of the semi-cylindrical bearings is provided with a circumferential groove on an inner surface of the one semi-cylindrical bearing, which circumferential groove extends from at least one of two abutting ends with respect to the other semi-cylindrical bearing toward a circumferential center part of the one semi-cylindrical bearing, and is in alignment with the lubricant oil outlet port, so that during operation of the internal combustion engine, the lubricant oil, which is fed from the journal portion of the crankshaft through the internal lubricant oil passage extending to the diametrical through hole in the crankpin, is supplied into the bearing clearance between the crankpin and the connecting rod bearing from the diametrical through hole, and flows smoothly in the circumferential groove, together with the foreign substances, toward the abutting ends of the pair of semi-circular bearings in the rotating direction of the crankpin.

Further, in the connecting rod bearing, the circumferential groove has a depth of 0.1 to 0.8 mm; a circumferential length which is not less than a diameter of the lubricant oil outlet port, the diameter being measured in the circumferential direction of the semi-cylindrical bearing, which maximum limit length corresponds to a circumferential angle of 45 degree measured from the at least one abutting end as a start point, and which does not include a length of a groove region adjacent to a terminal end of the circumferential groove on a side of the circumferential center part of the one semi-cylindrical bearing; and a width of which is not less than one half of the diameter of the lubricant oil outlet port, the diameter being measured in the axial direction of the semi-cylindrical bearing, which maximum width is defined by widths of inner surface regions locating on both axial sides of the circumferential groove, each of the widths being 2 mm.

According to such a constitution, the foreign substances having a larger size than that of the bearing clearance (i.e. the clearance between the connecting rod bearing and the crankpin), which have been left in the lubricant oil passage in the crankshaft and travel together with the lubricant oil, can be trapped in the circumferential groove.

Still further, according to the constitution, the foreign substances trapped in the circumferential groove can hardly contact with the lubricant oil outlet port of the crankpin, and the foreign substances can be trapped in the circumferential groove without occurrence of the phenomena that the foreign substances having a large size is sheared into small size pieces, which can enter into the bearing clearance, by an edge of the lubricant oil outlet port, and that the foreign substances are dragged out from the circumferential groove thereby damaging the inner surface of the bearing. Thus, the sliding surface of the connecting rod bearing can be prevented from being damaged. Further, according to the invention, it is unnecessary to provide the connecting rod bearing with a passage for discharging large foreign substances, so that the leakage amount of the lubricant oil from the inner surface of the connecting rod bearing can be significantly decreased.

Thus, it is possible to achieve the object of the present invention that is to prevent occurrence of damage without discharging the large size foreign substances from the connecting rod bearing, which foreign substances are accompanied in the lubricant oil fed to the connecting rod bearing from a cylinder block of an internal combustion engine through the journal portion of a crankshaft.

BRIEF DESCRIPTION OF SEVERAL VIEWS OF THE DRAWINGS

Explanation will be hereinbelow made of the preferred embodiments of the present invention with reference to the accompanying drawings wherein.

DESCRIPTION OF THE EMBODIMENTS OF THE INVENTION

Referring to the accompanying drawings, hereinbelow there will be provided a description of some embodiments of the invention.

Embodiment 1

Figure 1:
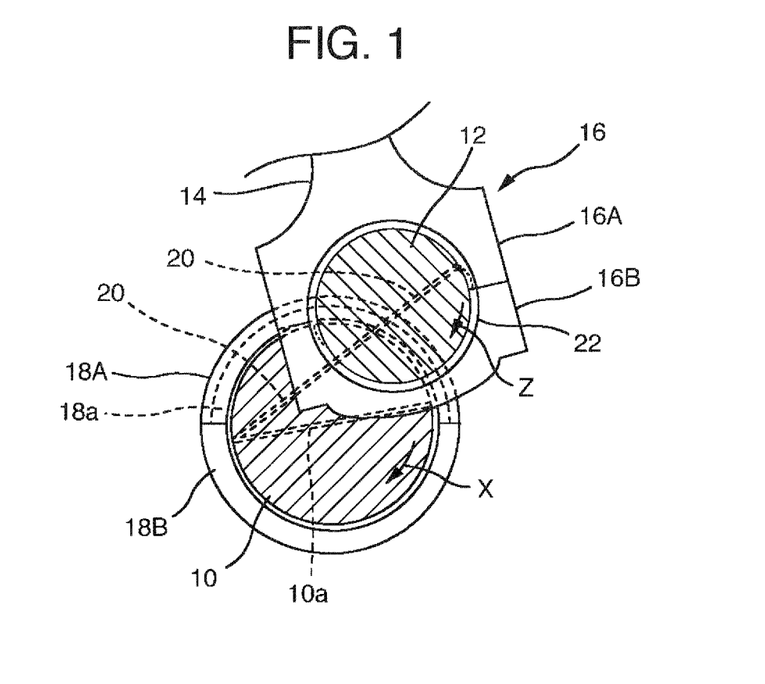
FIG. 1 is a schematic view of a crankshaft in an internal combustion engine, in which the crankshaft is sectioned in a journal part and a crankpin respectively.

FIG. 1 is a schematic view showing a crank shaft in an internal combustion engine with sectional views showing a journal portion and a crankpin portion. The crankshaft has a journal 10, a crankpin 12 and a connecting rod 14. The journal 10 is positioned in the back space side and the crankpin 12 is positioned in the page space side of FIG. 1. The crankpin 12 is surrounded by a big end housing 16 of the connecting rod 14 which carries at the other end a piston.

The journal 10 is supported in the lower portion of a cylinder block of the internal combustion engine via a pair of semi-cylindrical bearings 18A, 18B. The semi-cylindrical bearing 18A, which is disposed on the upper side as viewed in the drawing, is provided with a circumferential groove 18a on its inner surface in an overall circumferential length.

Further, the journal 10 has a diametrical through hole 10a with opposite end openings which are alternately communicated with the lubricant oil grooves 18a when the journal 10 rotates in the direction of the arrow X.

Moreover, a lubricant oil passage 20 is formed in the crankshaft, passing through the journal 10, a crank arm which is not shown, and the crankpin 12.

Figure 3:
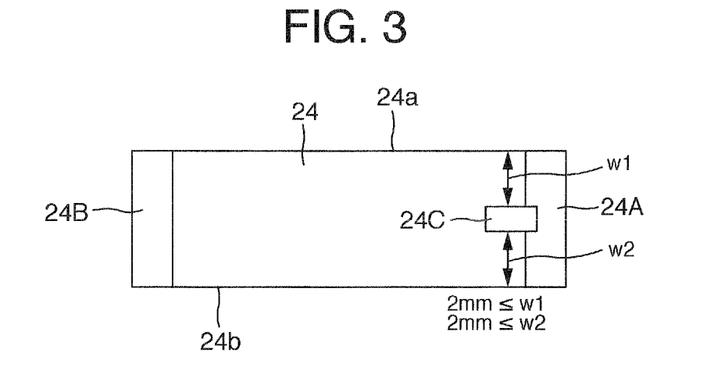
FIG. 3 is a view showing the inner surface of an upper semi-circular bearing of the connecting rod bearing shown in FIG. 2.
Figure 4:
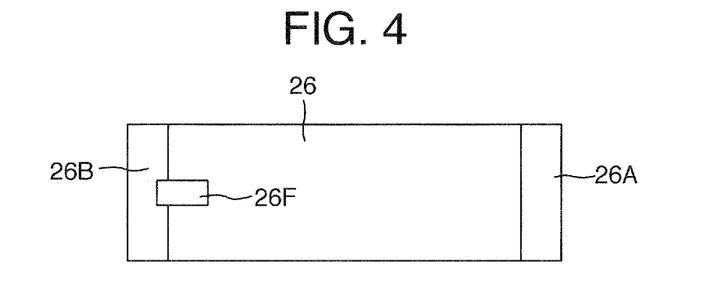
FIG. 4 is a view showing an inner surface of a lower semi-cylindrical bearing of the connecting rod bearing shown in FIG. 2.

The crankpin 12 is supported by the big end housing 16 of the connecting rod 14, which consists of a connecting rod side big end housing 16A and a cap side big end housing 16B, via a pair of semi-cylindrical bearings 24, 26. The semi-cylindrical bearings 24, 26 are combined with each other by abutting circumferential ends thereof to form a connecting rod bearing 22. The semi-cylindrical bearings 24, 26 constituting the connecting rod bearing 22 are shown in detail in FIGS. 2 to 4. The semi-cylindrical bearing 24 is provided with a circumferential groove 24C extending from a circumferential end 24A which is one of circumferential ends 24A, 24B of the semi-cylindrical bearing 24, toward the circumferentially center part of the same, and having a length which is measured in the circumferential direction of the semi-cylindrical bearing 24, and which is at least equal to or greater than diameter (d) of the lubricant oil outlet port 20A opened at the surface of the crankpin, as measured along the circumferential direction of the semi-cylindrical bearing half 24, and which has a maximum limit length corresponding to an angle of 45 degrees as measured along the circumferential direction of the semi-cylindrical bearing 24 from one abutting end 24A as a start point, the circumferential groove 24C being in alignment with the position of the lubricant oil outlet port 20A. Further, the circumferential groove 24C is located in the center part of the axial length of the semi-cylindrical bearing 24 (i.e. the length between the axially opposite sides 24a, 24b), and is aligned with the position of the lubricant oil outlet port 20A.

Figure 2:
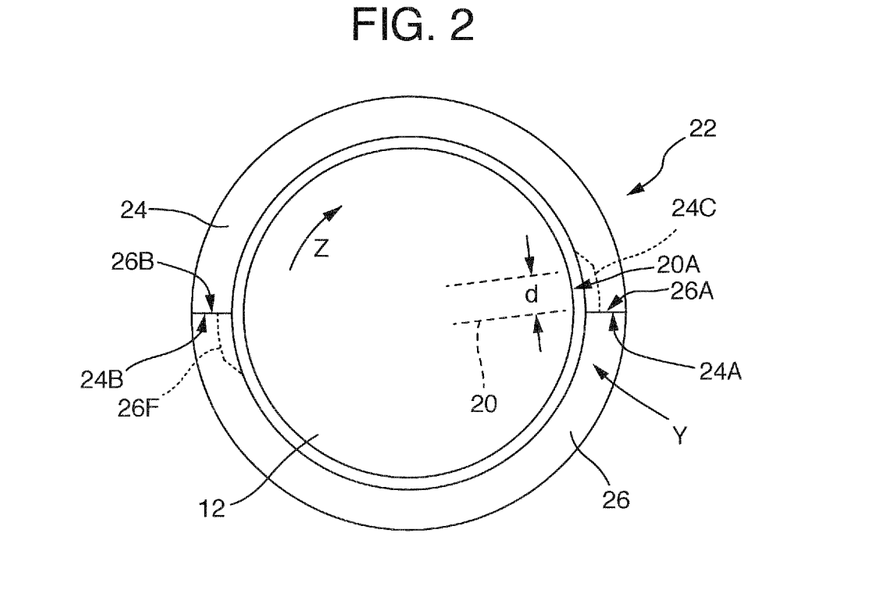
FIG. 2 is a side view for explaining a relationship between the crankpin on rotation and a connecting rod bearing in Embodiment 1 of the present invention.

Referring to FIG. 2, the circumferential groove 24C of the semi-cylindrical bearing 24 extends from the circumferential end 24A, which is oriented in the same direction as the rotational direction of the crankpin, and which is disposed on the leading end side as viewed in the rotational direction (i.e. the direction of the arrow Z) of the crankpin 12.

In this embodiment, there is formed a circumferential groove 26F in the side of a circumferential end 26B, which is one of the circumferential ends 26A, 26B of the semi-cylindrical bearing 26, similar to the circumferential groove 24C as stated above. The circumferential groove 26F is positioned on the circumferential end 26B side line-symmetrically to the circumferential groove 24C on the circumferential end 24A side with reference to the center line (i.e. the axis) of the connecting rod bearing. The circumferential groove 26F is also formed in the end 26B side which is disposed on the leading end side of the semi-cylindrical bearing 26 as viewed in the rotating direction of the crankpin 12.

Next, is a description concerning dimensions of the components in this embodiment.

(1) The widths of the circumferential grooves 24C, 26F:
These grooves are not less than ½ of the diameter of the lubricant oil outlet port 20A as measured in the axial direction of the semi-cylindrical bearing. A maximum value of the width is defined by widths of inner surface regions located on both axial sides of the circumferential groove, each of the widths being 2 mm. Reasons: Even though the width (as measured in the circumferential direction) of the circumferential groove is ½ of the lubricant oil outlet port 20 which is opened at the surface of the crankpin, the foreign substances can be well trapped in the circumferential groove, since the foreign substances are discharged from a backside of the lubricant oil outlet port 20A with respect to the rotational direction of the crankpin. Further, since the circumferential groove is so formed to leave a width w1 and w2 (FIG. 3) which is at least not less than 2 mm at each axial side region between the circumferential groove and one of the axial ends of the semi-cylindrical bearing, the foreign substances can be prevented from escaping from the circumferential groove and as well the lubricant oil can be prevented from leaking. Such effects can be enhanced by making the width of the circumferential groove equal to the diameter of the lubricant oil outlet port 20A as measured in the axial direction of the semi-cylindrical bearing.

(2) The depth of the circumferential grooves 24C, 26F: These grooves are formed to have a depth of 0.1 to 0.8 mm taking into consideration the size of the foreign substances in view of preventing the foreign substances trapped in the circumferential grooves from contacting with the lubricant oil outlet port 20A. However, it is noted that in the case of forming a finish machining end region (i.e. a smaller groove-depth region) of the circumferential groove residing in the side of the circumferential center part of the semi-cylindrical bearing, although the groove depth in the finish machining end region is made smaller than 0.1 mm, it is needed to make the circumferential groove to have a depth of 0.1 to 0.8 mm at least in a circumferential length range from the circumferential end toward the circumferential center part, which length range corresponds to a diameter of the lubricant oil outlet port 20A as measured in the circumferential direction of the semi-cylindrical bearing. Further, although the circumferential groove may be made to have side wall surfaces as chamfered surfaces (i.e. slanted surfaces), it is needed to make the groove depth to have a depth of 0.1 to 0.8 mm at least in a width range which corresponds to not less than ½ of the diameter of the lubricant oil outlet port 20A as measured in the axial direction of the semi-cylindrical bearing. In general, while the semi-cylindrical bearings have been provided with crush reliefs so as to locally reduce the wall thickness of both circumferential end regions thereof (i.e. the abutting end regions thereof with respect the other semi-cylindrical bearing in the pair), in such a case, the depth of the circumferential grooves 24C, 26F may be made larger so as to exceed a reduction value of thickness in the crush relief regions with reference to the wall thickness of the circumferential center parts of the semi-cylindrical bearings.

(3) The length of the circumferential grooves 24C, 26F: These grooves have a circumferential length which is not less than the diameter of the lubricant oil outlet port 20A as measured in the circumferential direction of the semi-cylindrical bearing, except for the finish machining end region of the circumferential groove having a depth less than the specified groove depth. The circumferential length has a maximum limit length corresponding to a circumferential angle range of 45 degree as measured in the circumferential direction of the semi-cylindrical bearing from the abutting end as a start point. The circumferential angle is set so as to avoid the circumferentially center region of the semi-cylindrical bearing 24, 26 taking into consideration the capturing ability for the foreign substances and the fact that the circumferentially center region bears a largest load as compared with the remaining regions.

(4) The crush reliefs: The dimensions of the crush reliefs extending from the inner side edges of the circumferential ends 24A, 24B, 26A and 26B of the semi-cylindrical bearings are such that the circumferential length is set to be 3 to 15 mm, and the wall thickness reduction value as mentioned above is set to be 0.01 to 0.05 mm.

Hereinbelow there will be described a function of the embodiment of the connecting rod bearing having a configuration set forth above.

Figure 5:
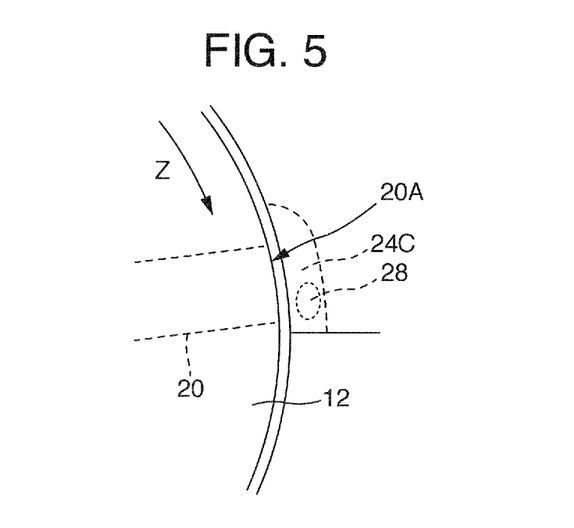
FIG. 5 is an enlarged view showing a part indicated by the arrow Y in FIG. 2.

During the operation of the internal combustion engine, lubricant oil is supplied into the lubricant oil groove 18a formed in the inner surface of one of the pair of semi-cylindrical bearings constituting the main bearing for supporting the journal 10, from an oil gallery formed in a cylinder block through an opening formed by piercing through the wall of the semi-cylindrical bearing 18A provided with the lubricant oil groove 18a. Both end openings of the diametrical through-hole 10a formed in the journal 10 are intermittently brought into fluid communication with the lubricant oil groove 18a upon rotation of the journal 10. Upon the communication, the through-hole 10a is exposed to a pressure of the lubricant oil, and the lubricant oil passage 20 connected to the through hole 10a is also exposed to the oil pressure. Thus, the lubricant oil is supplied into the sliding surface part between the crankpin 12 and the connecting rod bearing 22 through the lubricant oil outlet port 20A of the lubricant oil passage 20 which opens at the outer surface of the crankpin 12. However, when the lubricant oil outlet port 20a is intermittently brought into fluid-communication with the circumferential grooves 24C, 26F during rotation of the crankpin 12, a large quantity of the lubricant oil flows into the circumferential grooves 24C, 26F, and accordingly, the foreign substances 28, having a large size, which exist in the diametrical through hole 10a formed in the journal 10 and the lubricant oil passage 20 in the crankpin 12 are washed out toward the circumferential grooves (FIG. 5). The foreign substances 28 which are carried to the circumferential ends 24A, 26B through the circumferential grooves 24C, 26F can hardly enter into the sliding surface part of the mating semi-cylindrical bearing since no circumferential grooves are provided thereto, and accordingly, the most of all foreign substances merely remain in the circumferential grooves 24C, 26F.

Since the circumferential grooves 24C, 26F are so formed that large size foreign substances 28 trapped in the circumferential grooves do not contact with the lubricant oil outlet port 20A, there will not occur such cases that the foreign substances are dragged out from the circumferential grooves 24C, 26F to damage the sliding surfaces of the connecting rod bearing and the crankpin, and the large size foreign substances 28 are sheared into small pieces which enters between the sliding surfaces.

By causing the large size foreign substances to remain in the circumferential grooves, no discharge passage for the large size foreign substances is needed, so that there is no increase in the leakage amount of the lubricant oil according to the invention connecting rod bearing.

In this embodiment, if the circumferential grooves 24C, 26F are so formed that the cross-sectional area of each of the circumferential grooves 24C, 26F gradually increases from the circumferentially center part of the inner surface of the bearing to the abutting end, a flow of the lubricant oil accompanying the foreign substances becomes slower toward the abutting end, thereby enabling to avoid occurrence of a phenomenon that the lubricant oil accompanying the foreign substances flows over the axial groove due to inertial force and enters into the region of the mating semi-cylindrical bearing.

Embodiment 2

Figure 6:
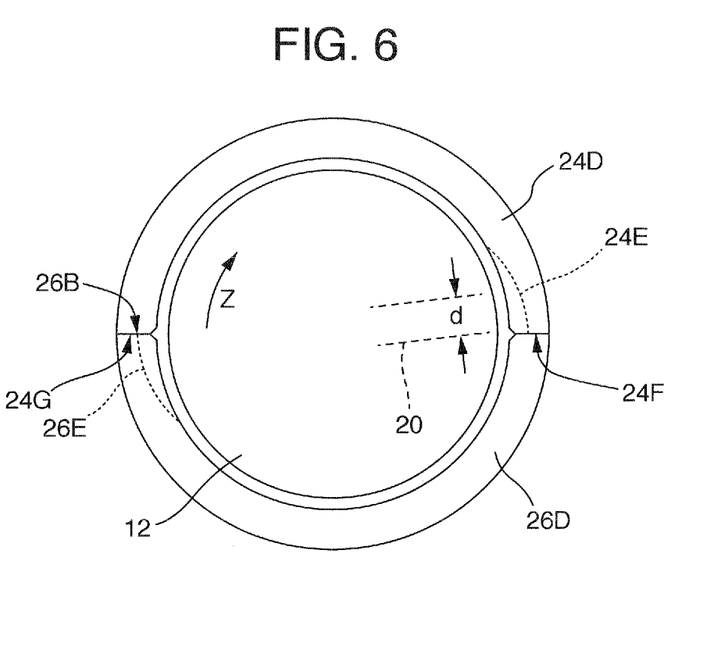
FIG. 6 is a side view showing a connecting rod bearing in Embodiment 2 of the present invention.

Referring to FIG. 6, a semi-cylindrical bearing 24D is provided with a circumferential groove 24E in the side of the circumferential end 24F which is oriented to the rotating direction (see arrow Z) of the crankpin 12. Similarly, a mating semi-cylindrical bearing 26D is provided with a circumferential groove 26E in the side of the circumferential end 26B which is oriented to the rotating direction (see arrow Z) of the crankpin 12.

Figure 7:
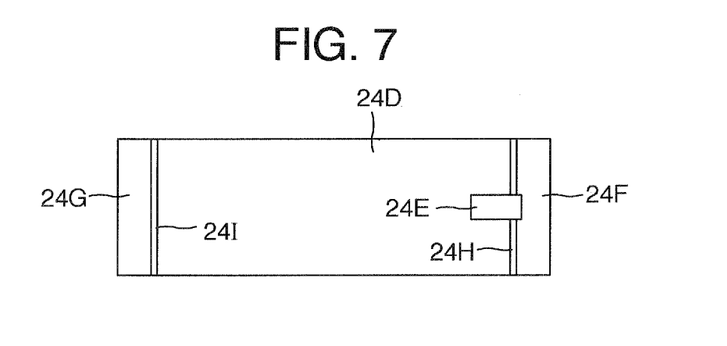
FIG. 7 is a view showing an inner surface of an upper semi-cylindrical bearing of the connecting rod bearing shown in FIG. 6.
Figure 8:
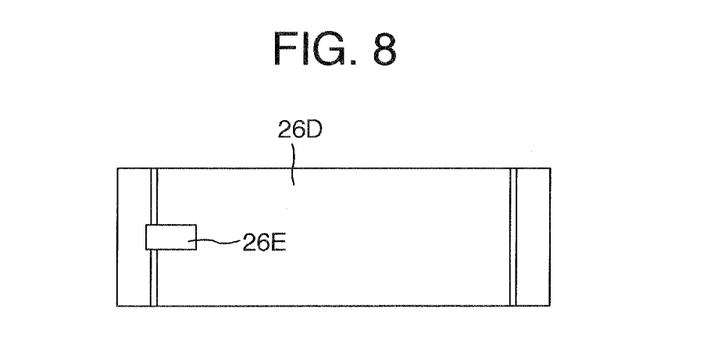
FIG. 8 is a view showing an inner surface of a lower semi-cylindrical bearing of the connecting rod bearing shown in FIG. 6.
Figure 9:
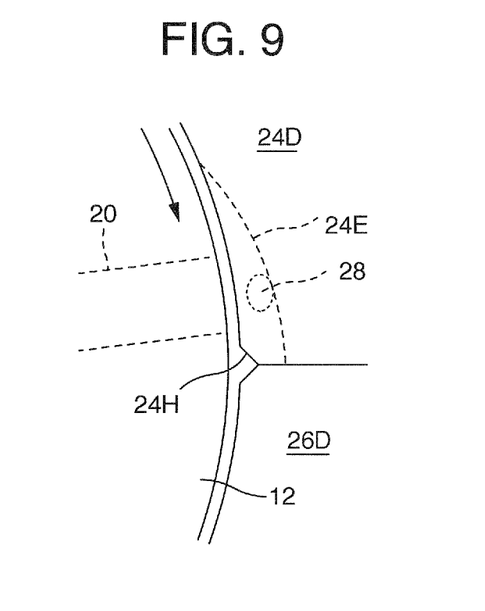
FIG. 9 is a view showing Embodiment 2, which is similar to FIG. 5.
Figure 10:
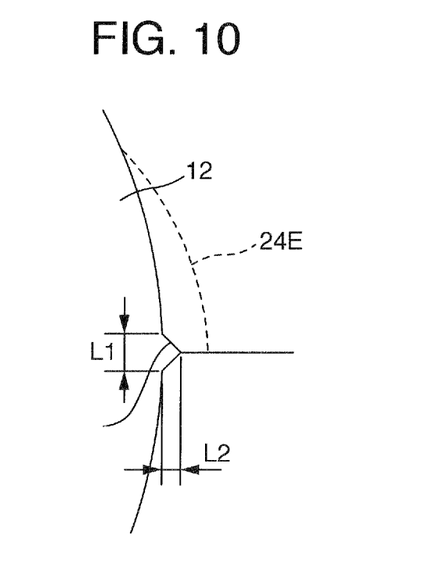
FIG. 10 is a view showing a dimensional relationship of the connecting rod bearing in Embodiment 2 of the present invention.

Further, the circumferential ends 24F, 24G of the semi-cylindrical bearing 24D are also provided with inclined surfaces 24H, 24I (see FIG. 7) at inner side circumferential end edges of the semi-cylindrical bearing. The semi-cylindrical bearing 26D is formed line-symmetrically with the semi-cylindrical bearing 24D with reference to the axis of the connecting rod bearing. The inclined surfaces 24H, 24I of the semi-cylindrical bearing 24D define axial grooves in cooperation with the similar inclined surfaces of the semi-cylindrical bearing 26D. It should be noted that only the inclined surfaces 24H, 24I can define the axial grooves even without the inclined surfaces of the semi-cylindrical bearing 26D.

The axial grooves defined between the inclined surfaces of the semi-cylindrical bearings 24D, 26D, have a width (L1) of less than 2 mm, and a depth (L2) of 0.1 to 0.5 mm.

Reasons why the axial grooves are formed:

In order to discharge smaller foreign substances (not shown) other than the large size foreign substances 28 accompanied in the lubricant oil, which smaller foreign substances cannot remain in the circumferential groove since they can enter into the bearing clearance, the axial grooves may be provided on the semi-cylindrical bearings, which are defined by the inclined surfaces set forth above, and which are in fluid-communication with the circumferential grooves 24E, 26E. If the circumferential grooves 24E, 26E are formed so as to have a larger cross-sectional area than that of the axial grooves, the lubricant oil with the foreign substances flowing through the circumferential grooves 24E, 26E at a relatively lower rate, increases its flow rate in the axial grooves and flows out rapidly outside of the bearing from the opposite side parts (i.e. bearing widthwise side parts) which are parallel with a plane orthogonal to the bearing axis.

Since the large size foreign substances is caused to remain in the circumferential grooves 24E, 26E, it is unnecessary to make the axial grooves to have a large cross-sectional area thereby enabling avoidance of an increase of a leakage amount of the lubricant oil.

Embodiment 3

In Embodiment 2, explanation has been made of the connecting rod bearing having the configuration where the semi-cylindrical bearing 24D provided with the circumferential groove 24E that is formed only on the side of the circumferential end 24F oriented to the rotating direction of the crankpin 12 (see arrow Z in FIG. 6) is combined with the semi-cylindrical bearing 26D provided with the circumferential groove 26E which is formed only on the side of the circumferential end 26B oriented to the rotating direction of the crankpin 12 (see arrow Z in FIG. 6).

Figure 11:
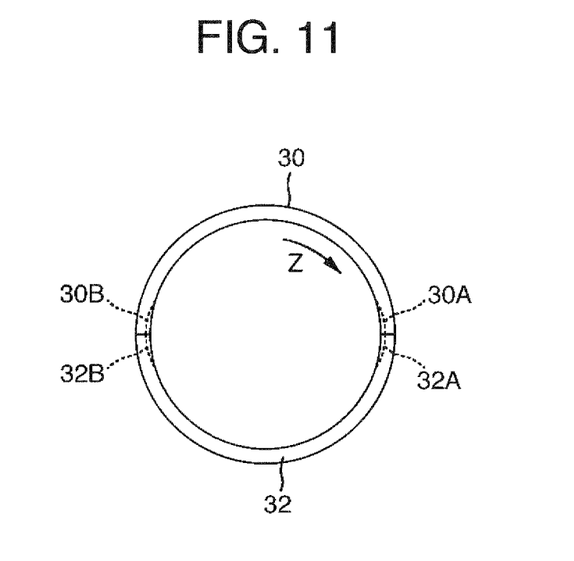
FIG. 11 is a side view showing a connecting rod bearing in Embodiment 3 of the present invention.

According to Embodiment 3 (a modification) shown in FIG. 11, it is possible to obtain a practically acceptable effect of retaining large size foreign substances, although the effect is somewhat inferior as compared with that of Embodiment 1. In Embodiment 3, there is used a connecting rod bearing consisting of a semi-cylindrical bearing 30 disposed on an upper side (that is, the connecting rod side of the big end housing) and a semi-cylindrical bearing 32 disposed on the lower side (that is, the cap side of the big end housing). Both semi-cylindrical bearings 30, 32 have circumferential grooves 30A, 30B, 32A, 32B similar to the circumferential grooves 24E, 26E in Embodiment 2, and axial grooves (not shown) similar to the axial grooves in Embodiment 2. The connecting rod bearing in this embodiment has not only circumferential grooves 30A, 32B for causing the foreign substances to flow into the axial grooves, on the side of the circumferential end oriented to the normal rotational direction (see arrow Z) of the crankpin 12, but also circumferential grooves on the side of the circumferential end oriented to the opposite direction to the rotating direction of the crankpin 12. Thus, it is possible to avoid erroneously assembling the semi-cylindrical bearings such that the circumferential grooves are arranged only on the side of the circumferential ends oriented to the opposite direction to the rotational direction of the crankpin 12.

In this embodiment, large size foreign substances are liable to move toward a smaller depth region of the circumferential groove formed on the side of the circumferential end oriented to the opposite direction to that of the crankpin, which region resides on the side of circumferential center part, so as to possibly cause the foreign substances to make contact with the lubricant oil outlet port 20A at the surface of the crankpin 12. Therefore, it is preferable to form the circumferential groove so as to satisfy the equation of (a depth of the circumferential groove on the abutting end)/(a circumferential length of the circumferential groove)>0.02. With such a configuration, it is possible to make the depth of the circumferential groove on the side of the abutting end large so that the surface of the crankpin 12 is sufficiently separated from the bottom of the circumferential groove. Thus, a wedge effect can hardly occur, so that the lubricant oil flows slowly in the circumferential groove, thereby enabling the oil pressure to be lower. On the other hand, at the opposite end side of the circumferential groove, since the surface of the crankpin 12 is close to the bottom of the circumferential groove, the oil pressure is high due to a wedge effect. If the relative difference between such pressures of the lubricant oil is large, since a stream in the opposite direction to the rotating direction of the crankpin occurs in the vicinity of the bottom of the circumferential groove on the back side of the rotating direction of the crankpin, the foreign substances are restrained from moving toward the circumferential end at the side of the circumferential center part of the semi-cylindrical bearing, thereby it is expected that the foreign substances can remain in the circumferential groove.

Further, in the case where the circumferential grooves 30A, 32A and 30B, 32B are formed in pairs at the abutting ends of the semi-cylindrical bearings 30, 32, there may be presented a modification that the groove depth is set to be 0.1 to 0.8 mm and the above equation is satisfied in the regions of the abutting ends of the circumferential grooves in each pair within the range which is specified by a length corresponding to at least the diameter of the lubricant oil outlet port as measured in the circumferential direction of the bearing.

Embodiment 4

Figure 12:
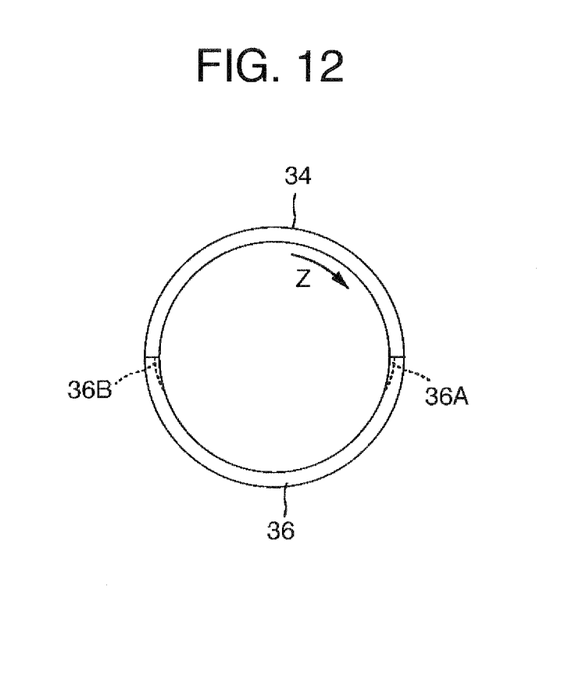
FIG. 12 is side view showing a connecting rod bearing in Embodiment 4 of the present invention.

In Embodiment 4 (another modification) shown in FIG. 12, there is provided a connecting rod bearing consisting of a semi-cylindrical bearing 34 disposed on the upper side (that is, on the connecting rod side of the big end housing) and a semi-cylindrical bearing 36 disposed on the lower side (the cap end side of the big eng housing). The semi-cylindrical bearing 34 has no circumferential groove. On the other hand, the semi-cylindrical bearing 36 is provided with circumferential grooves 36A, 36B having a configuration similar to those of the circumferential grooves 24E, 26E in Embodiment 2, and axial grooves (not shown) having a configuration similar to the axial grooves in Embodiment 2. Embodiment 4 shown in FIG. 12 has a foreign substance discharge effect which is practically acceptable even though which is somewhat inferior as compared with that of Embodiment 2. The connecting rod bearing in this embodiment has not only the circumferential groove 36B on the side of the circumferential end oriented to the normal rotating direction (see arrow Z) of the crankpin 12, for causing the foreign substances to move into the axial groove but also the circumferential groove 36A on the opposite end side oriented to the opposite direction to the normal rotational direction of the crankpin 12, thereby enabling to prevent occurrence of erroneously assembling the semi-cylindrical bearings in the connecting rod such that the circumferential groove is positioned only on the side of the circumferential end oriented to the opposite direction to the normal direction of the crankpin 12. Further, the semi-cylindrical bearing 36 provided with the circumferential grooves as a semi-cylindrical bearing disposed on the upper side (that is, on the connecting rod side of the big end housing), and the semi-cylindrical bearing 34 with no oil groove along the overall circumferential length thereof as a semi-cylindrical bearing disposed on the lower side (on the cap side of the big end housing).

In this embodiment, large size foreign substances are liable to move toward a smaller depth region of the circumferential groove formed on the side of the circumferential end oriented to the opposite direction to that of the crankpin, which region resides on the side of circumferential center part, so as to possibly cause the foreign substances to make contact with the lubricant oil outlet port 20A at the surface of the crankpin 12. Therefore, it is preferable to form the circumferential groove so as to satisfy the equation of (a depth of the circumferential groove on the abutting end)/(a circumferential length of the circumferential groove)>0.02.

Experiment for confirming the foreign substances capturing ability of the connecting rod bearing:

Connecting rod bearings as explained in Embodiments 1 to 3 were prepared in accordance with the specifications shown in Table 1 as specimens which were tested in the following test conditions (see also Table 2):

(1) Engine used: a V6 gasoline engine;

(2) Size of foreign substances: 0.5 mm;

(3) Method of feeding foreign substances: two ferrous foreign substances were attached to an inner surface of a lubricant oil passage (i.e. an oil bore) in a crankpin with use of grease; and (4) After running the gasoline engine in a short period, states of the inner surfaces of the connecting rod bearings were examined with respect to Embodiments 1 to 3 and as well a conventional connecting rod bearing as a reference specimen.

TABLE 1

Specification of Groove Formation (Unit: mm)

| Specification Particulars | Circumferential groove | | | | Axial Groove | |
|---|---|---|---|---|---|---|
| | Width | Length | Depth | Groove Position | Width | Depth |
| Conventional specimens | — | — | — | — | 1 | 0.3 |
| Embodiment 1 | 7 | 8 | 0.5 | See grooves of upper/lower bearings in FIG. 2 | — | — |
| Embodiment 2 | 7 | 8 | 0.5 | See grooves of upper/lower bearings in FIG. 6 | 1 | 0.5 |
| Embodiment 3 | 7 | 5 | 0.5 | See grooves of upper/lower bearings in FIG. 11 | 1 | 0.5 |

(*Note: The depth of the circumferential groove is ensured so as to be not less than 0.1 mm over the lengthwise range corresponding to the diameter of the lubricant oil outlet port measured in the circumferential direction of the bearing.)

Table 2

TABLE 2

Test Condition

| Item | Dimensions | Unit |
|---|---|---|
| Shaft Dia. | 50 | mm |
| Bearing Width | 15 | mm |
| Revolution Speed | 5,000 | r.p.m. |
| Test Time | 0.5 | hour |
| Lubricant oil (Type) | 0W-20 | — |
| Lubricant oil Passage Dia. | 6 | mm |

(*Note: The shaft is a crankpin.)

Figure 13:
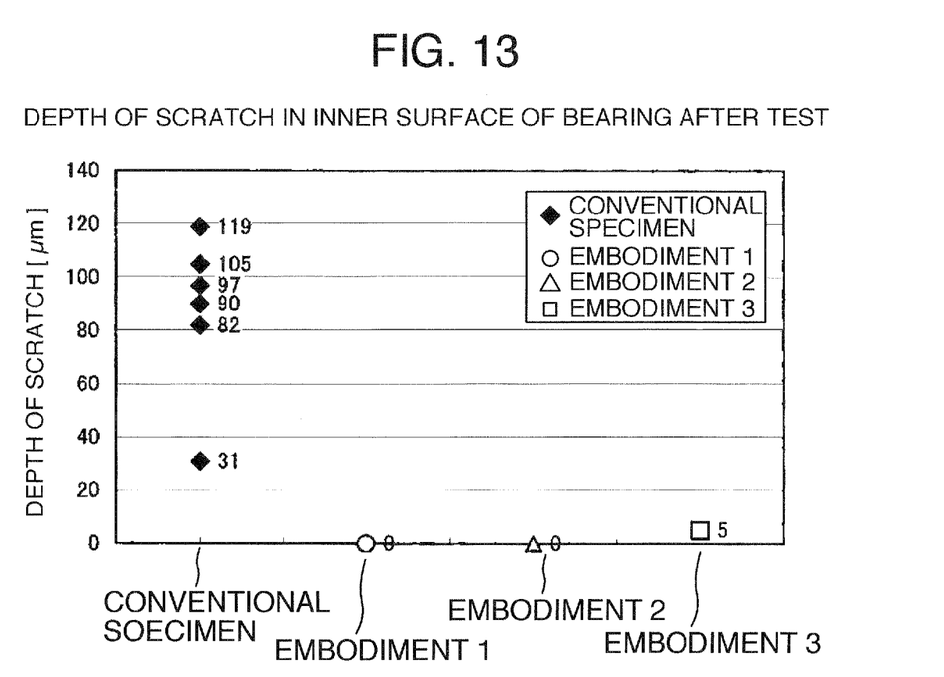
FIG. 13 is a graph representing test results relating to the ability of capturing foreign substances as to a conventional specimen, and Embodiments 1 to 3 of the present invention.

Test Results:

The test results are shown in FIG. 13:
(1) The conventional connecting rod bearing: there were found heavy scratches having about 80 to 120 μm in the inner surfaces of the bearing, and foreign substances was embedded in the inner surface;
(2) Embodiments 1 and 2: There are found no scratches in the inner surfaces of the bearings and as well there were found no foreign substances at the inner surface; and
(3) Embodiment 3: There was found a slight scratch having 5 μm, and there were found no embedded foreign substances at the inner surfaces of the bearing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A connecting rod bearing for an internal combustion engine being constituted such that lubricant oil, which has been supplied onto an inner surface of a connecting rod bearing for supporting a crankshaft, is supplied onto the inner surface of the connecting rod bearing, rotatably supporting a crankpin connecting a connecting rod to the crankshaft, from a lubricant oil outlet port at a surface of the crankpin through an oil passage in the crankshaft, the connecting rod bearing consisting of a pair of semi-cylindrical bearings one of which is an upper semi-cylindrical bearing which is disposed on a connecting rod side of a big end housing of the connecting rod, and the other one of which is a lower semi-cylindrical bearing which is disposed on a cap side of the big end housing of the connecting rod, each of the semi-cylindrical bearings having a circumferential center part and the upper semi-cylindrical bearing being assembled so that the circumferential center part of the upper semi-cylindrical bearing is in alignment with an axis of the connecting rod, wherein at least one of the semi-cylindrical bearings is provided with a circumferential groove on an inner surface of the at least one of the semi-cylindrical bearings, the circumferential groove extends from at least one of two abutting ends with respect to the other semi-cylindrical bearing toward the circumferential center part of the at least one of the semi-cylindrical bearings, and is in alignment with the lubricant oil outlet port, the at least one abutting end being oriented toward the same direction as a direction of relative rotation of the crankpin with respect to the connecting rod bearing, and wherein the circumferential groove has a depth of 0.1 to 0.8 mm; a circumferential length which is not less than a diameter of the lubricant oil outlet port, the diameter being measured in a circumferential direction of the at least one of semi-cylindrical bearings, and wherein the circumferential groove extends around the at least one of the semi-cylindrical bearings to a maximum angle of 45 degrees measured from the at least one abutting end as a start point, and which does not include a length of a groove region adjacent to a terminal end of the circumferential groove on a side of the circumferential center part of the at least one of the semi-cylindrical bearings; and a width of which is not less than one half of the diameter of the lubricant oil outlet port, the diameter being measured in an axial direction of the at least one of the semi-cylindrical bearings, and a maximum width being defined by widths of inner surface regions locating on both axial sides of the circumferential groove, each of the widths being 2 mm.

2. A connecting rod bearing according to claim 1, wherein the maximum width of the circumferential groove is equal to the diameter of the lubricant oil outlet port as measured in the axial direction of the at least one of the semi-cylindrical bearings on which the circumferential groove is disposed.

3. A connecting rod bearing according to claim 2, wherein a cross-sectional area of the circumferential groove becomes gradually larger from the side of the circumferential center part of the inner surface of the at least one of the semi-cylindrical bearings on which the circumferential groove is disposed, toward the abutting end thereof.

4. A connecting rod bearing according to claim 1, wherein a cross-sectional area of the circumferential groove becomes gradually larger from the side of the circumferential center part of the inner surface of the at least one of the semi-cylindrical bearings on which the circumferential groove is disposed, toward the abutting end thereof.

5. A connecting rod bearing according to claim 1, wherein in a state that the pair of semi-cylindrical bearings are assembled cylindrically by abutting the abutting ends with one another, there is formed an axial groove along an overall inner side corner edge of the at least one abutting end of at least one of the semi-cylindrical bearings, on a side of the at least one abutting end there is present the circumferential groove, the axial groove being connected to the circumferential groove in fluid communication with each other serving as the oil passage, wherein a cross-sectional area of the circumferential groove is greater than that of the axial groove at a connection part of the circumferential groove and the axial groove.

6. A connecting rod bearing according to claim 5, wherein the axial groove includes a crush relief formed in the inner surface of the at least one of the semi-cylindrical bearings, adjacent to the abutting end of the at least one of the semi-cylindrical bearings.

7. A connecting rod bearing according to claim 5, wherein each of the pair of semi-cylindrical bearings is provided with the circumferential groove and the axial groove, and the circumferential and axial grooves of the pair of semi-cylindrical bearings are arranged line-symmetrically with reference to an axis of the connecting rod bearing.

* * * * *